United States Patent
Wu et al.

(10) Patent No.: US 9,208,668 B1
(45) Date of Patent: Dec. 8, 2015

(54) CAMERA SYSTEM WITH A FULL VIEW MONITORING FUNCTION

(71) Applicant: GeoVision Inc., Taipei (TW)

(72) Inventors: Chih-Ming Wu, New Taipei (TW);
Chun-Kai Hsu, New Taipei (TW);
Chun-Tao Lee, New Taipei (TW)

(73) Assignee: GeoVision Inc., Taipei (TW)

( * ) Notice: Subject to any disclaimer, the term of this patent is extended or adjusted under 35 U.S.C. 154(b) by 0 days.

(21) Appl. No.: 14/487,108

(22) Filed: Sep. 16, 2014

(51) Int. Cl.
| | |
|---|---|
| *H04N 5/225* | (2006.01) |
| *H04N 5/232* | (2006.01) |
| *H04N 7/18* | (2006.01) |
| *G08B 13/196* | (2006.01) |
| *H04N 5/247* | (2006.01) |

(52) U.S. Cl.
CPC .... *G08B 13/19641* (2013.01); *G08B 13/19645* (2013.01); *H04N 5/2253* (2013.01); *H04N 5/23238* (2013.01); *H04N 5/23296* (2013.01); *H04N 5/247* (2013.01); *H04N 7/181* (2013.01)

(58) Field of Classification Search
CPC ................ G08B 13/19641; G08B 13/19643; G08B 13/19645; H04N 5/2253; H04N 5/247; H04N 5/23238; H04N 5/23296; H04N 7/181
See application file for complete search history.

(56) References Cited

U.S. PATENT DOCUMENTS

| | | | |
|---|---|---|---|
| 6,977,676 B1* | 12/2005 | Sato et al. | 348/211.11 |
| 2006/0028548 A1* | 2/2006 | Salivar et al. | 348/143 |
| 2006/0056056 A1* | 3/2006 | Ahiska et al. | 359/690 |
| 2007/0236570 A1* | 10/2007 | Sun et al. | 348/159 |
| 2011/0063449 A1* | 3/2011 | Lee | 348/159 |
| 2011/0249100 A1* | 10/2011 | Jayaram et al. | 348/48 |
| 2015/0162048 A1* | 6/2015 | Hirata et al. | G11B 20/10527 |

FOREIGN PATENT DOCUMENTS

WO WO 2009/066988 A2 * 5/2009 ............... H04N 7/18

* cited by examiner

*Primary Examiner* — W B Perkey
(74) *Attorney, Agent, or Firm* — Winston Hsu; Scott Margo (57) ABSTRACT

A camera system with a full view monitoring function includes a base, a first camera apparatus, at least one second camera apparatus and a controller. The first camera apparatus is fixed on the base and invariably faces toward a first direction. The first camera apparatus is adapted to capture a panorama image. The second camera apparatus is movably disposed on the base and adjustably faces toward a detecting direction different from the first direction. The second camera apparatus is adapted to encircle around the first camera apparatus. The controller is electrically connected to the first camera apparatus and the second camera apparatus. The controller is adapted to analyze the panorama image to filter out a triggering zone, to encircle the second camera apparatus toward a detecting direction corresponding to the triggering zone, and to drive the second camera apparatus to capture a detecting image overlapping the triggering zone.

15 Claims, 7 Drawing Sheets

CAMERA SYSTEM WITH A FULL VIEW MONITORING FUNCTION

BACKGROUND OF THE INVENTION

1. Field of the Invention

The present invention relates to a camera system, and more particularly, to a camera system with a full view monitoring function.

2. Description of the Prior Art

A monitoring system is extensively applied to the public place, such as the train station, the supermarket, the street and so on. A fisheye camera or a PTZ camera is applied to the conventional monitoring system. Capturing orientation of the fisheye camera is unchangeable, and the fisheye camera captures a panorama image to view a large area within an environment. However, the edge of the panorama image may be indistinct because of optical distortion phenomenon, and cannot clearly provide detailed characteristic for image identification. The PTZ camera represents the camera lens can be panned, tilted and zoomed in/out to capture the small-size image. The PTZ camera cannot capture the panorama image, so that application of the PTZ camera is unable to monitor the wide public place.

SUMMARY OF THE INVENTION

The present invention provides a camera system with a full view monitoring function for solving above drawbacks.

According to the claimed invention, a camera system with a full view monitoring function includes a base, a first camera apparatus, at least one second camera apparatus and a controller. The first camera apparatus is fixed on the base and invariably faces toward a first direction. The first camera apparatus is adapted to capture a panorama image. The second camera apparatus is movably disposed on the base and adjustably faces toward a detecting direction different from the first direction. The second camera apparatus is adapted to encircle around the first camera apparatus. The controller is electrically connected to the first camera apparatus and the second camera apparatus. The controller is adapted to analyze the panorama image to filter out a triggering zone, to encircle the second camera apparatus toward a detecting direction corresponding to the triggering zone, and to drive the second camera apparatus to capture a detecting image overlapping the triggering zone.

According to the claimed invention, the camera system further includes a rotating mechanism electrically connected to the controller and the second camera apparatus. The controller utilizes the rotating mechanism to rotate the second camera apparatus relative to the base at a second direction substantially perpendicular to the first direction, and further to shift the second camera apparatus at a third direction encircling round the first direction.

According to the claimed invention, a view field of the second camera apparatus switchably covers a plane simultaneously parallel to the first direction and the second direction.

According to the claimed invention, the third direction is a clockwise direction or a counterclockwise direction relative to the first direction.

According to the claimed invention, the base includes a central portion and a rotary portion. The first camera apparatus is disposed on the central portion, the second camera apparatus is disposed on the rotary portion, and the rotary portion revolves round the central portion.

According to the claimed invention, the central portion is an upright structure, the rotary portion is an annular holder or an arc holder that moves along a track encircling the upright structure.

According to the claimed invention, the rotary portion is a tray with a central hole. The central portion passes through the central hole and is encircled by the rotary portion.

According to the claimed invention, the first camera apparatus does not rotate since the second camera apparatus encircles around the first camera apparatus to switch toward the detecting direction.

According to the claimed invention, the controller compares the triggering zone with a threshold, and determines whether the second camera apparatus is driven to capture the detecting image according to a comparison.

According to the claimed invention, the controller drives the second camera apparatus to scan the triggering zone in reciprocation since the triggering zone is greater than a view field of the second camera apparatus.

According to the claimed invention, the camera system further includes a display panel electrically connected to the controller. The controller drives the display panel to simultaneously display the panorama image and the detecting image.

According to the claimed invention, the camera system further includes a plurality of second camera apparatuses movably disposed on the base. The plurality of second camera apparatuses adjustably faces toward corresponding detecting directions.

According to the claimed invention, the base includes a central portion and a rotary portion. The first camera apparatus is disposed on the central portion, the plurality of second camera apparatuses is disposed on different position of the rotary portion in symmetry or in asymmetry, and the rotary portion revolves round the central portion.

According to the claimed invention, the base includes a central portion and a plurality of rotary portions. The first camera apparatus is disposed on the central portion, the plurality of second camera apparatuses is respectively disposed on the corresponding rotary portion, and the plurality of rotary portions respectively revolves round the central portion.

According to the claimed invention, each of the rotary portions is rotatably disposed on the central portion and independent of another rotary portion.

The present invention includes the first camera apparatus and at least one second camera apparatus. The first camera apparatus is immovable and utilized to capture the wide-view panorama image. A part of the panorama image may be indistinct due to the optical distortion, so that the second camera apparatus without distortion effect is applied to capture the narrow-view detecting image for compensation of the wide-view panorama image. The second camera apparatus can be rotated relative to the base at the second direction and further can be shifted at the third direction by revolution of the rotary portion round the central portion to dynamically cover the whole range surrounding the camera system. Comparing to the prior art, the present invention has advantages of automatically dynamic compensation, full-view observation and local magnification, can effectively identify any subtle difference within environment where the camera system is located.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
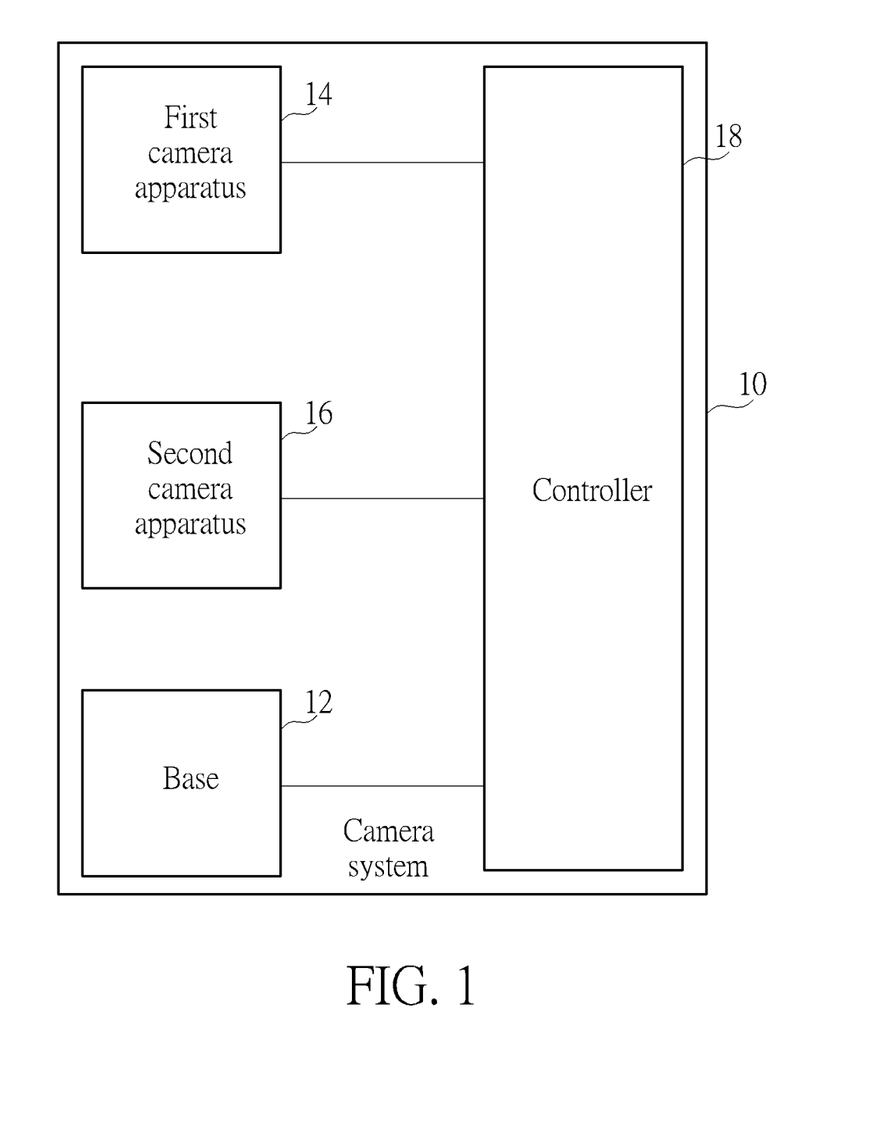
FIG. 1 is a functional block diagram of a camera system according to an embodiment of the present invention.
Figure 2:
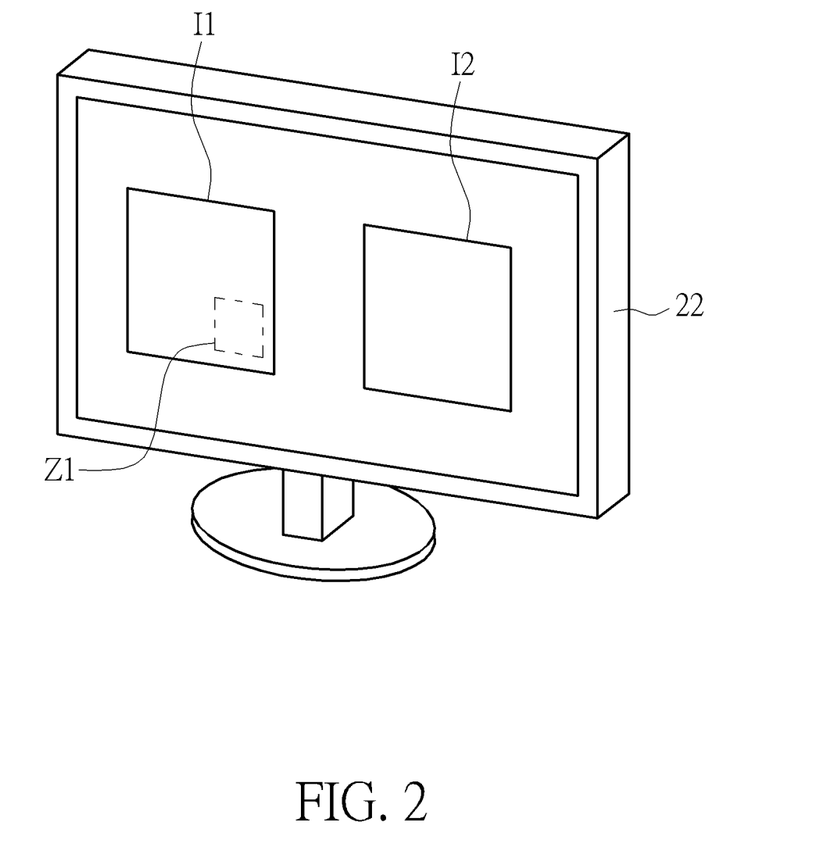
FIG. 2 is a diagram of a display panel according to the embodiment of the present invention.
Figure 3:
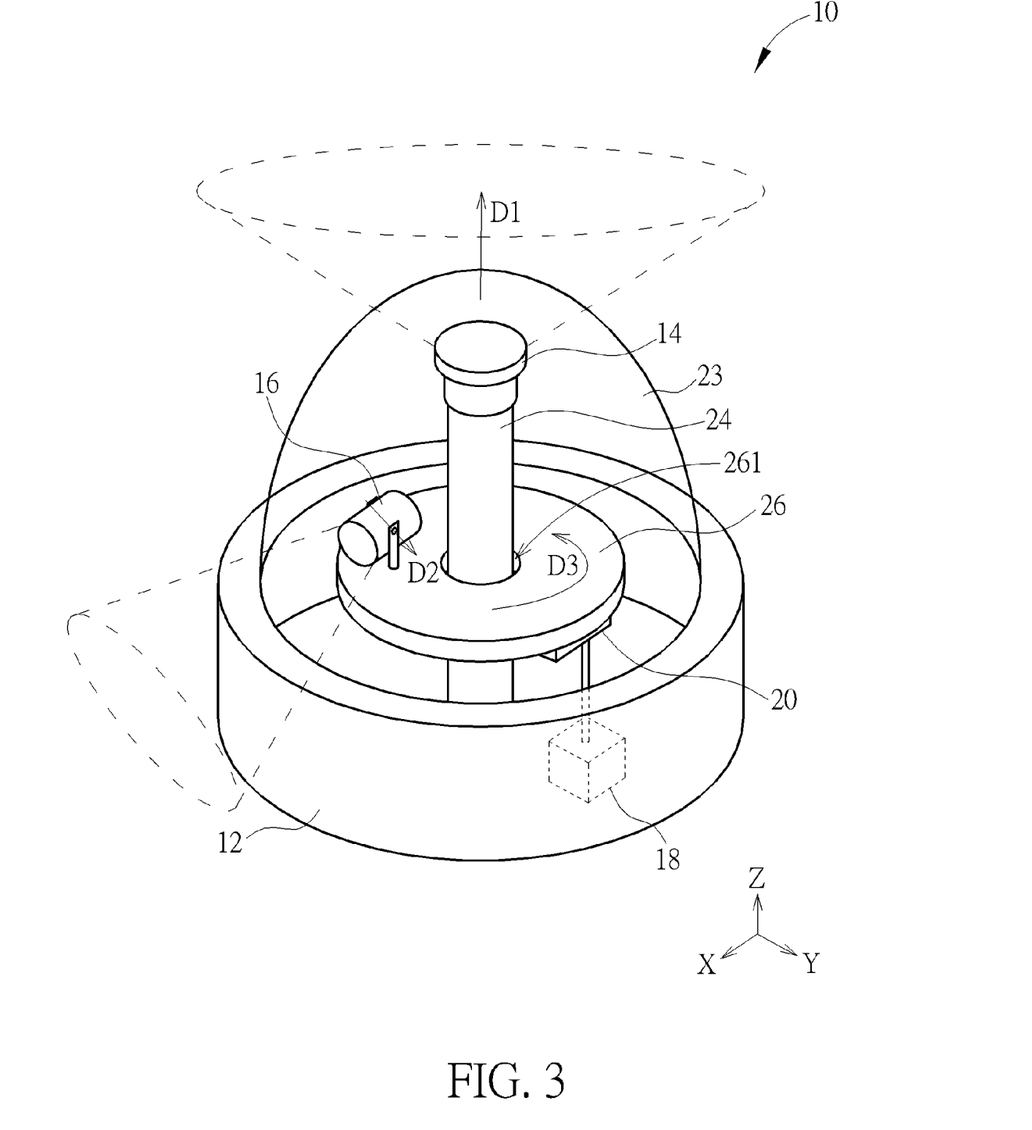
FIG. 3 is a structural diagram of the camera system according to the embodiment of the present invention.

Please refer to FIG. 1 to FIG. 3. FIG. 1 is a functional block diagram of a camera system 10 according to an embodiment of the present invention. FIG. 2 is a diagram of a display panel 22 applied to the camera system 10 according to the embodiment of the present invention. FIG. 3 is a structural diagram of the camera system 10 according to the embodiment of the present invention. The camera system 10 includes a base 12, a first camera apparatus 14, at least one second camera apparatus 16, a controller 18, a rotating mechanism 20 and the display panel 22. The first camera apparatus 14 is fixed on the base 12 and invariably faces toward a first direction D1. The first camera apparatus 14 can be a fisheye camera and is adapted to capture a panorama image I1. The second camera apparatus 16 is movably disposed on the base 12 by the rotating mechanism 20 and adjustably faces toward a detecting direction which is different from the first direction D1. For example, the first direction D1 substantially orients to Z-axis, and the detecting direction can orient to X-axis and/or Y-axis, switchably move over X-Y plane, X-Z plane and/or Y-Z plane.

Additionally, the first camera apparatus 14 and the second camera apparatus 16 may be covered by a protective mask 23. The protective mask 23 can be an arc structure for waterproof and dustproof protection and is made of transparent material. The rotating mechanism 20 may be a slide rail mechanism or a gear mechanism. Any mechanical mechanism capable of stably rotating the second camera apparatus 16 conforms to scope of the rotating mechanism 20 of the present invention. Further, the controller 18 is electrically connected to the first camera apparatus 14, the second camera apparatus 16, the rotating mechanism 20 and the display panel 22.

In an operational process of the camera system 10, the controller 18 firstably drives the first camera apparatus 14 to capture the panorama image I1. The panorama image I1 is analyzed to filter out a triggering zone Z1, and the triggering zone Z1 may represent a questionable zone within the panorama image I1. The controller 18 further compares the triggering zone Z1 with a threshold, which may be a predetermined parameter or an auto-updated parameter, to determine whether the second camera apparatus 16 is driven to capture a detecting image I2 according to a foresaid comparison. For example, the second camera apparatus 16 does not move toward the triggering zone Z1 or the second camera apparatus 16 scans its whole view field since the triggering zone Z1 is lower than the threshold. When the triggering zone Z1 is greater than the threshold, the second camera apparatus 16 is actuated to focus on the detecting direction (which corresponds to the triggering zone Z1) and captures the detecting image I2 without optical distortion phenomenon. Because detailed characteristics within the triggering zone Z1 may be difficult to be identified by the panorama image I1, the controller 18 drives the display panel 22 to simultaneously display the panorama image I1 and the detecting image I2, so that the user can distinctly confirm the foresaid detailed characteristics by the detecting image I2.

Exhibition of the panorama image I1 and the detecting image I2 is not limited to the above-mentioned embodiment, and depends on actual demand. The detecting image I2 may partly overlaps the panorama image I1, or the detecting image I2 may be magnified by an external command, such as the command from a keyboard or a mouse, to be larger than the panorama image I1 on the display panel 22. In addition, the controller 18 can drive the second camera apparatus 16 to scan the triggering zone Z1 in reciprocation since the triggering zone Z1 is greater than the view field of the second camera apparatus 16, and a plurality of detecting images I2 is captured and can be displayed on the display panel 22 in sequence for convenient identification. The view field of the first camera apparatus 14 is wider than the view field of the second camera apparatus 16. Cone forms shown in FIG. 3 respectively represent the view fields of the first camera apparatus 14 and the second camera apparatus 16.

The base 12 includes a central portion 24 and a rotary portion 26. The central portion 24 can be an upright structure, and the rotary portion 26 can be an annular holder or an arc holder that moves along a track encircling the upright structure. The first camera apparatus 14 is disposed on the central portion 24 without rotary/shift movement. The second camera apparatus 16 is disposed on the rotary portion 26, and can encircle around the first camera apparatus 14 by revolution of rotary portion 26 round the central portion 24. Generally, the rotary portion 26 preferably can be a tray with a central hole 261, the central portion 24 passes through the central hole 261 and is encircled by the rotary portion 26. The controller 18 can drive the rotating mechanism 20 to rotate the second camera apparatus 16 relative to the base 12 at a second direction D2 substantially perpendicular to the first direction D1, and further to shift the second camera apparatus 16 at a third direction D3 encircling round the first direction D1, which means the detecting direction can switchably orient to X-axis, Y-axis, X-Y plane, X-Z plane and/or Y-Z plane.

As shown in FIG. 3, the third direction D3 can be a clockwise direction or a counterclockwise direction relative to the first direction D1. The view field of the second camera apparatus 16 can switchably cover the X-Z plane and/or the Y-Z plane simultaneously parallel to the first direction D1 and the second direction D2 since the second camera apparatus 16 rotates relative to the base 12 at the second direction D2. The view field of the second camera apparatus 16 further can switchably cover the X-Y plane since the second camera apparatus 16 is shifted at the third direction D3. The second camera apparatus 16 is driven to face toward the detecting direction which is the same as or different from the first direction D1, and is adapted to capture the detecting image I2 that overlaps the triggering zone within the panorama image I1 or does not coincide with the panorama image I1. Therefore, the camera system 10 provides a full view monitoring function.

Figure 4:
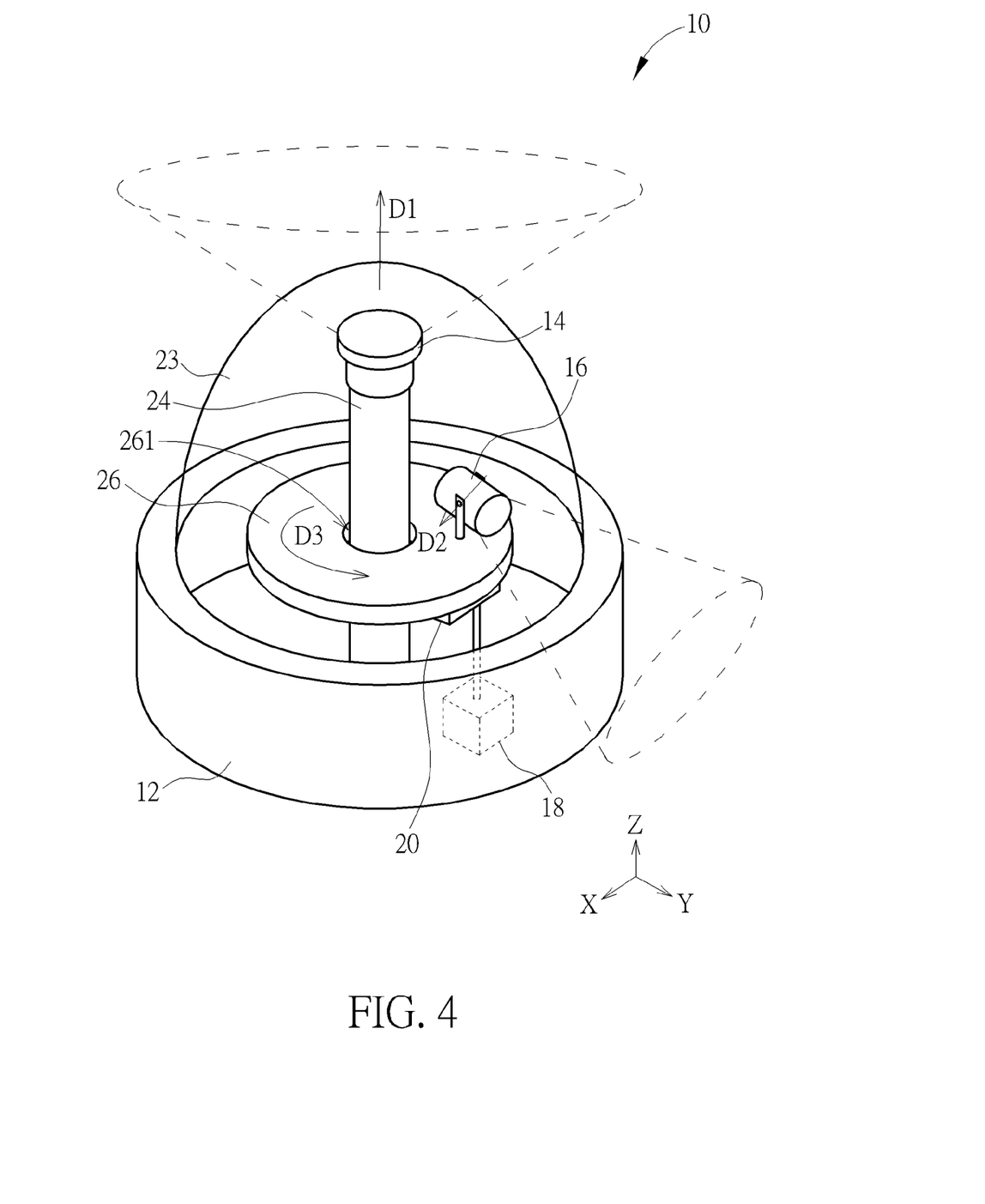
FIG. 4 and FIG. 5 respectively are diagrams of the camera system in different operational modes according to the embodiment of the present invention.
Figure 5:
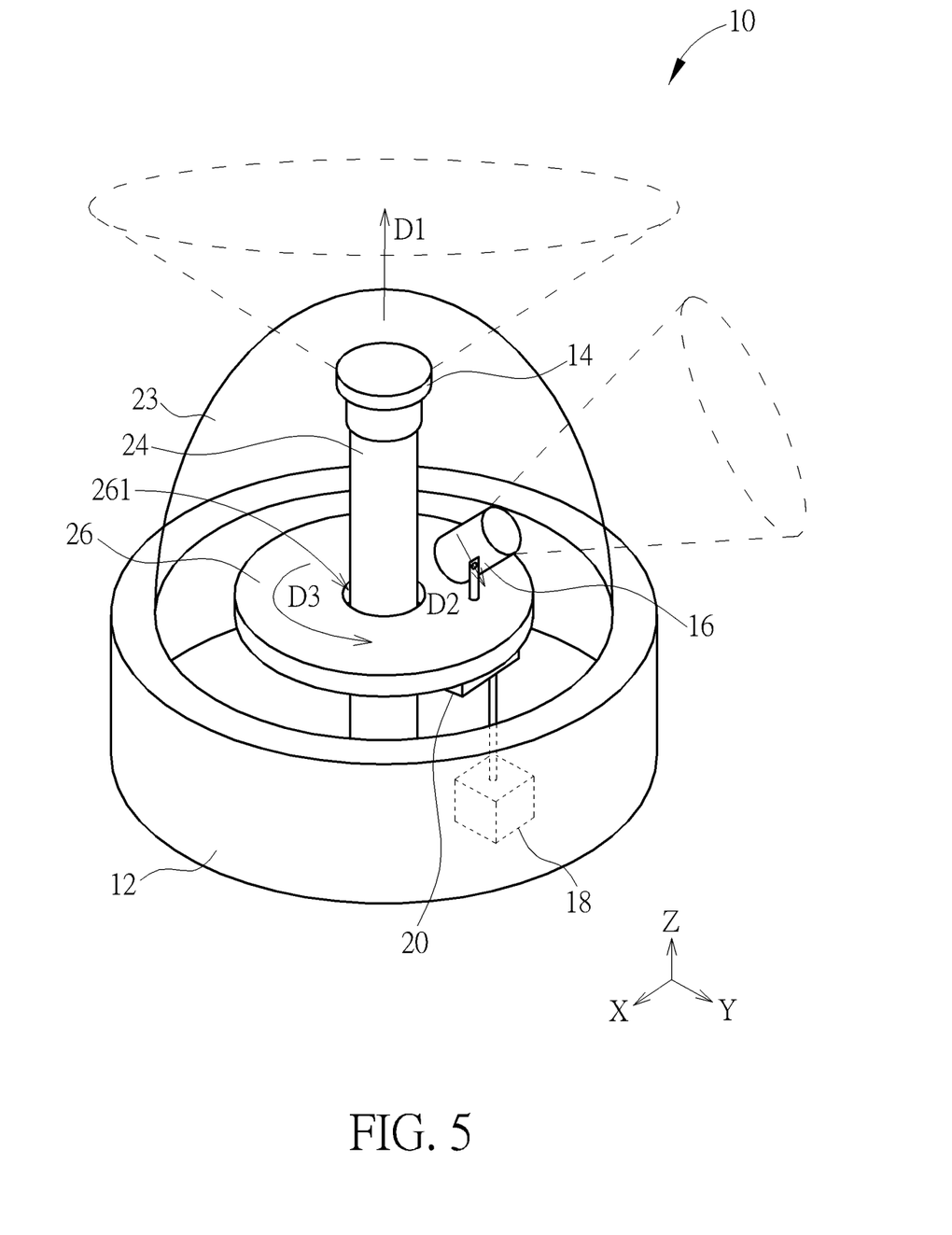

Please refer to FIG. 3 to FIG. 5. FIG. 4 and FIG. 5 respectively are diagrams of the camera system 10 in different operational modes according to the embodiment of the present invention. The first camera apparatus 14 is fixed toward the first direction D1 to capture the panorama image I1. The controller 18 drives the second camera apparatus 16 to search the specific detecting direction via clockwise encirclement or counterclockwise encirclement of the rotary portion 26 and/or via rotation of the second camera apparatus 16 according to analysis of the triggering zone, which means the second camera apparatus 16 can be freely encircled along the third direction D3 from a position shown in FIG. 3 to a position shown in FIG. 4, and/or freely rotated along the second direction D2 from the position shown in FIG. 4 to a position shown in FIG. 5. Thus, the second camera apparatus 16 can capture the detecting image I2 overlapping the triggering zone Z1 within the panorama image I1, the detecting image I2 partly overlapping an edge of the panorama image I1 to enhance the detailed characteristic located on the foresaid edge, and/or the detecting image I2 out of the view field of the first camera apparatus 14. The first camera apparatus 14 does not rotate since the second camera apparatus 16 encircles around the first camera apparatus 14 to switch toward the detecting direction.

Figure 6:
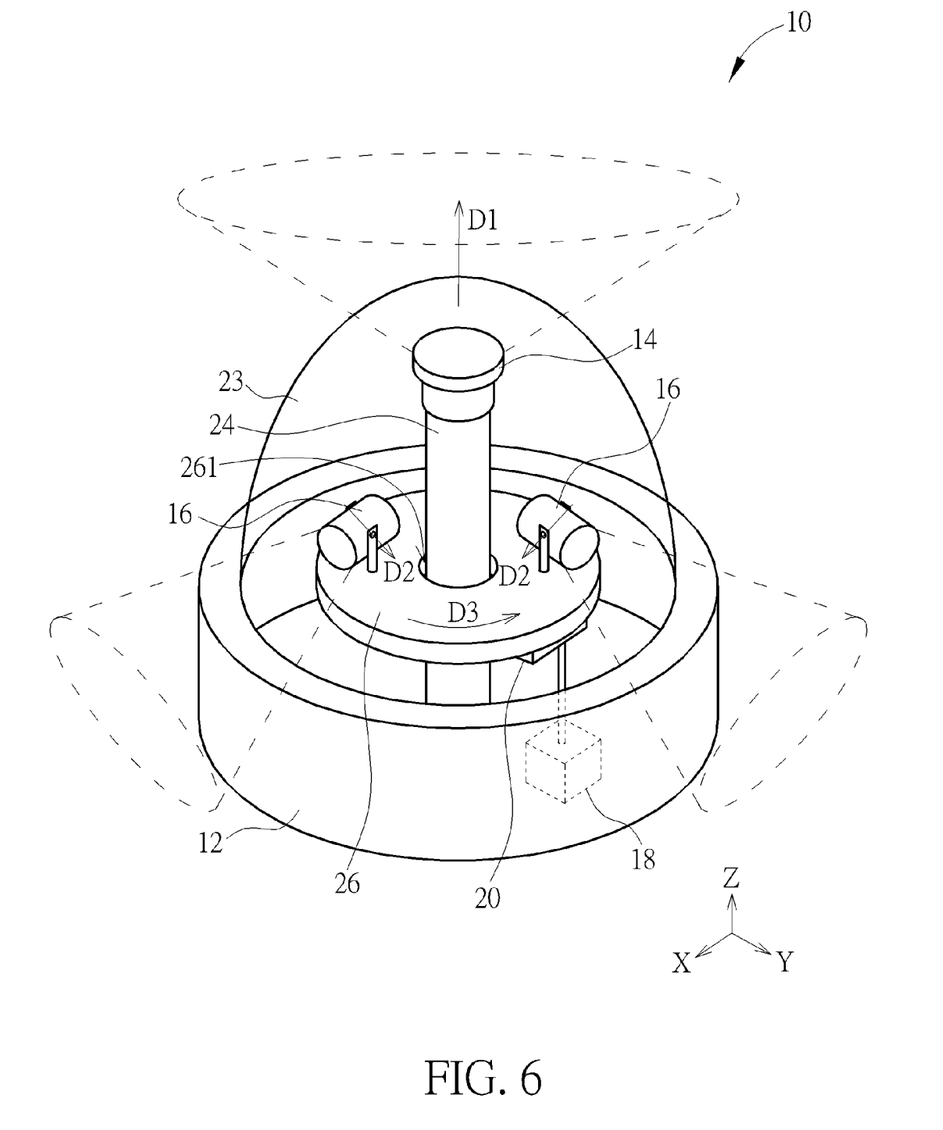
FIG. 6 and FIG. 7 respectively are diagrams of the camera system according to different embodiments of the present invention.
Figure 7:
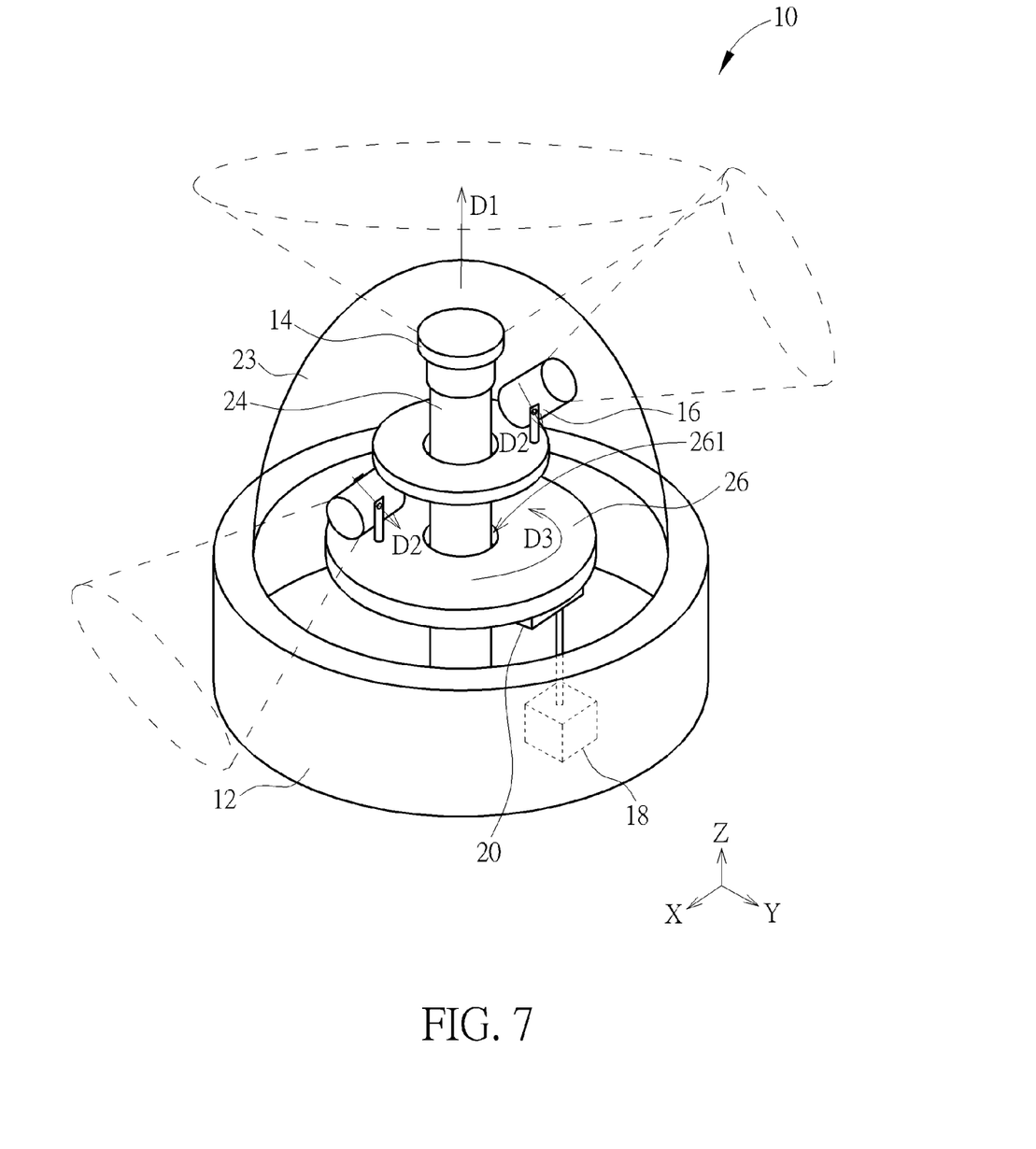

Please refer to FIG. 6 and FIG. 7. FIG. 6 and FIG. 7 respectively are diagrams of the camera system 10 according to different embodiments of the present invention. As shown in FIG. 6, the camera system 10 can include a plurality of second camera apparatuses 16. The first camera apparatus 14 is invariably fixed on the central portion 24, and the plurality of second camera apparatuses 16 is respectively disposed on different position of the rotary portion 26 in symmetry or in asymmetry. The rotary portion 26 revolves round the central portion 24, the plurality of second camera apparatuses 16 adjustably face toward corresponding detecting directions, and the camera system 10 can simultaneously magnify plenty of triggering zones Z1 within the panorama image I1. As shown in FIG. 7, the base 12 includes the central portion 24 and a plurality of rotary portions 26. The first camera apparatus 14 is invariably fixed on the central portion 24, and the plurality of second camera apparatuses 16 is respectively disposed on the corresponding rotary portion 26. Because each of the rotary portions 26 is rotatably disposed on the central portion 24 and independent of another rotary portion 26, each of the rotary portions 26 can singly revolve round the central portion 24, and the plurality of second camera apparatuses 16 can adjustably face toward different detecting directions to capture the detecting images I2 that respectively coincide with different triggering zones Z1.

The present invention includes the first camera apparatus and at least one second camera apparatus. The first camera apparatus is immovable and utilized to capture the wide-view panorama image. A part of the panorama image may be indistinct due to the optical distortion, so that the second camera apparatus without distortion effect is applied to capture the narrow-view detecting image for compensation of the wide-view panorama image. The second camera apparatus can be rotated relative to the base at the second direction and further can be shifted at the third direction by revolution of the rotary portion round the central portion to dynamically cover the whole range surrounding the camera system. Comparing to the prior art, the present invention has advantages of automatically dynamic compensation, full-view observation and local magnification, can effectively identify any subtle difference within environment where the camera system is located.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A camera system with a full view monitoring function, the camera system comprising:
    a base;
    a first camera apparatus fixed on the base and invariably facing toward a first direction, the first camera apparatus being adapted to capture a panorama image;
    at least one second camera apparatus movably disposed on the base and adjustably facing toward a detecting direction different from the first direction, the second camera apparatus being adapted to encircle around the first camera apparatus; and
    a controller electrically connected to the first camera apparatus and the second camera apparatus, the controller being adapted to analyze the panorama image to filter out a triggering zone, to encircle the second camera apparatus toward a detecting direction corresponding to the triggering zone, and to drive the second camera apparatus to capture a detecting image overlapping the triggering zone.

2. The camera system of claim 1, further comprising:
    a rotating mechanism electrically connected to the controller and the second camera apparatus, the controller utilizing the rotating mechanism to rotate the second camera apparatus relative to the base at a second direction substantially perpendicular to the first direction and further to shift the second camera apparatus at a third direction encircling round the first direction.

3. The camera system of claim 2, wherein a view field of the second camera apparatus switchably covers a plane simultaneously parallel to the first direction and the second direction.

4. The camera system of claim 2, wherein the third direction is a clockwise direction or a counterclockwise direction relative to the first direction.

5. The camera system of claim 1, wherein the base comprises a central portion and a rotary portion, the first camera apparatus is disposed on the central portion, the second camera apparatus is disposed on the rotary portion, and the rotary portion revolves round the central portion.

6. The camera system of claim 5, wherein the central portion is an upright structure, the rotary portion is an annular holder or an arc holder encircling the upright structure.

7. The camera system of claim 5, wherein the rotary portion is a tray with a central hole, the central portion passes through the central hole and is encircled by the rotary portion.

8. The camera system of claim 1, wherein the first camera apparatus does not rotate since the second camera apparatus encircles around the first camera apparatus to switch toward the detecting direction.

9. The camera system of claim 1, wherein the controller compares the triggering zone with a threshold, and determines whether the second camera apparatus is driven to capture the detecting image according to a comparison.

10. The camera system of claim 1, wherein the controller drives the second camera apparatus to scan the triggering zone in reciprocation since the triggering zone is greater than a view field of the second camera apparatus.

11. The camera system of claim 1, further comprising:
    a display panel electrically connected to the controller, the controller driving the display panel to simultaneously display the panorama image and the detecting image.

12. The camera system of claim 1, further comprising:
    a plurality of second camera apparatuses movably disposed on the base and adjustably facing toward corresponding detecting directions.

13. The camera system of claim 12, wherein the base comprises a central portion and a rotary portion, the first camera apparatus is disposed on the central portion, the plurality of second camera apparatuses is disposed on different position of the rotary portion in symmetry or in asymmetry, and the rotary portion revolves round the central portion.

14. The camera system of claim 12, wherein the base comprises a central portion and a plurality of rotary portions, the first camera apparatus is disposed on the central portion, the plurality of second camera apparatuses is respectively disposed on the corresponding rotary portion, and the plurality of rotary portions respectively revolves round the central portion.

15. The camera system of claim 14, wherein each of the rotary portions is rotatably disposed on the central portion and independent of another rotary portion.

* * * * *